US011130161B2

(12) United States Patent
Yan et al.

(10) Patent No.: US 11,130,161 B2
(45) Date of Patent: Sep. 28, 2021

(54) HIGH-STRENGTH CORROSION-RESISTANT COMPOSITE CHEQUERED IRON AND MANUFACTURING METHOD THEREFOR

(71) Applicant: BAOSHAN IRON & STEEL CO., LTD., Shanghai (CN)

(72) Inventors: Bo Yan, Shanghai (CN); Sihai Jiao, Shanghai (CN); Xiaoming Xia, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 0 days.

(21) Appl. No.: 16/461,413

(22) PCT Filed: Nov. 16, 2017

(86) PCT No.: PCT/CN2017/011252
§ 371 (c)(1),
(2) Date: May 16, 2019

(87) PCT Pub. No.: WO2018/095258
PCT Pub. Date: May 31, 2018

(65) Prior Publication Data
US 2019/0344315 A1 Nov. 14, 2019

(30) Foreign Application Priority Data
Nov. 23, 2016 (CN) .......................... 201611037789.3

(51) Int. Cl.
*B32B 15/01* (2006.01)
*B21B 9/00* (2006.01)
(Continued)

(52) U.S. Cl.
CPC ................ *B21B 9/00* (2013.01); *B23K 20/00* (2013.01); *B23K 20/02* (2013.01); *B23K 20/04* (2013.01);
(Continued)

(58) Field of Classification Search
CPC .. B21B 9/00; B23K 2101/18; B23K 2101/34; B23K 31/02; B23K 20/02; B23K 20/22;
(Continued)

(56) References Cited

U.S. PATENT DOCUMENTS

| 4,784,922 A * | 11/1988 | Yoshimura ............. B23K 20/04 148/530 |
| 4,917,969 A * | 4/1990 | Pircher ................. B32B 15/011 428/685 |
| 2010/0124668 A1* | 5/2010 | Gupta ................... B32B 15/016 428/654 |

FOREIGN PATENT DOCUMENTS

| CN | 101804767 A | 8/2010 |
| CN | 104080937 A | 10/2014 |

(Continued)

OTHER PUBLICATIONS

Machine Translation, Von Hagen et al., EP 0 315 576, May 1989. (Year: 1989).*

(Continued)

*Primary Examiner* — Michael E. La Villa
(74) *Attorney, Agent, or Firm* — Flener iP & Business Law; Zareefa B. Flener (57) ABSTRACT

Disclosed are a high-strength corrosion-resistant cladding chequered steel and a manufacturing method therefor. The high-strength corrosion-resistant cladding chequered steel includes a substrate and a chequered cladding layer cladded on the substrate by single-sided or double-sided rolling. The mass percentages of the chemical elements of the substrate are: C: 0.01% to 0.20%, Si: 0.10% to 0.5%, Mn: 0.5% to 2.0%, Al: 0.02% to 0.04%, Ti: 0.005% to 0.018%, Nb: 0.005% to 0.020%, 0<B≤0.0003%, N≤0.006%, and the balance being steel and other inevitable impurities. The high-strength corrosion-resistant cladding steel plate has a high strength, a high corrosion resistance, a yield strength (Continued)

≥470 MPa, a tensile strength ≥610 MPa, a shear strength ≥410 MPa, and an elongation ≥40%.

8 Claims, 3 Drawing Sheets

(51) Int. Cl.

| | | |
|---|---|---|
| C22C 38/32 | (2006.01) | |
| C22C 38/28 | (2006.01) | |
| C22C 38/26 | (2006.01) | |
| C22C 38/08 | (2006.01) | |
| C22C 38/06 | (2006.01) | |
| C22C 38/04 | (2006.01) | |
| C22C 38/02 | (2006.01) | |
| C22C 38/00 | (2006.01) | |
| C21D 8/02 | (2006.01) | |
| B23K 20/02 | (2006.01) | |
| B23K 31/02 | (2006.01) | |
| C22C 38/22 | (2006.01) | |
| C22C 38/50 | (2006.01) | |
| C23C 28/02 | (2006.01) | |
| C22C 38/14 | (2006.01) | |
| C23C 30/00 | (2006.01) | |
| B32B 15/04 | (2006.01) | |
| C22C 38/44 | (2006.01) | |
| C22C 38/40 | (2006.01) | |
| B32B 15/18 | (2006.01) | |
| C22C 38/12 | (2006.01) | |
| C22C 38/18 | (2006.01) | |
| C22C 38/54 | (2006.01) | |
| B23K 20/227 | (2006.01) | |
| B23K 20/00 | (2006.01) | |
| B23K 20/22 | (2006.01) | |
| B23K 20/04 | (2006.01) | |
| B23K 103/04 | (2006.01) | |
| B23K 101/34 | (2006.01) | |
| B23K 103/16 | (2006.01) | |
| B23K 103/18 | (2006.01) | |
| B23K 101/18 | (2006.01) | |

(52) U.S. Cl.
CPC ............ *B23K 20/22* (2013.01); *B23K 20/227* (2013.01); *B23K 31/02* (2013.01); *B32B 15/01* (2013.01); *B32B 15/011* (2013.01); *B32B 15/012* (2013.01); *B32B 15/013* (2013.01); *B32B 15/04* (2013.01); *B32B 15/043* (2013.01); *B32B 15/18* (2013.01); *C21D 8/0226* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/18* (2013.01); *C22C 38/22* (2013.01); *C22C 38/26* (2013.01); *C22C 38/28* (2013.01); *C22C 38/32* (2013.01); *C22C 38/40* (2013.01); *C22C 38/44* (2013.01); *C22C 38/50* (2013.01); *C22C 38/54* (2013.01); *C23C 28/02* (2013.01); *C23C 28/028* (2013.01); *C23C 30/00* (2013.01); *C23C 30/005* (2013.01); *B23K 2101/18* (2018.08); *B23K 2101/34* (2018.08); *B23K 2103/04* (2018.08); *B23K 2103/05* (2018.08); *B23K 2103/166* (2018.08); *B23K 2103/18* (2018.08); *C21D 2211/005* (2013.01); *C21D 2211/009* (2013.01); *Y10T 428/12951* (2015.01); *Y10T 428/12958* (2015.01); *Y10T 428/12972* (2015.01); *Y10T 428/12979* (2015.01); *Y10T 428/12993* (2015.01); *Y10T 428/2495* (2015.01); *Y10T 428/24942* (2015.01); *Y10T 428/26* (2015.01)

(58) Field of Classification Search
CPC ...... B23K 20/227; B23K 20/00; B23K 20/04; B23K 2103/166; B23K 2103/04; B23K 2103/18; B23K 2103/05; C22C 38/32; C22C 38/28; C22C 38/26; C22C 38/08; C22C 38/06; C22C 38/04; C22C 38/02; C22C 38/002; C22C 38/001; C22C 38/12; C22C 38/14; C22C 38/18; C22C 38/22; C22C 38/40; C22C 38/44; C22C 38/50; C22C 38/54; C21D 8/0226; C21D 2211/005; C21D 2211/009; B32B 15/01; B32B 15/011; B32B 15/013; B32B 15/012; B32B 15/04; B32B 15/043; B32B 15/18; Y10T 428/12951; Y10T 428/12958; Y10T 428/12972; Y10T 428/12979; Y10T 428/12993; Y10T 428/2495; Y10T 428/24942; Y10T 428/26; C23C 30/00; C23C 30/005; C23C 28/028; C23C 28/02
See application file for complete search history.

(56) References Cited

FOREIGN PATENT DOCUMENTS

| | | |
|---|---|---|
| CN | 104786581 A | 7/2015 |
| CN | 104988414 A | 10/2015 |
| CN | 105074039 A | 11/2015 |
| CN | 105671424 A | 6/2016 |
| CN | 105880946 A | 8/2016 |
| CN | 105903764 A | 8/2016 |
| CN | 108085585 A | 5/2018 |
| EP | 0 315 576 A1 * | 5/1989 |
| EP | 0315576 A1 | 5/1989 |
| EP | 0320773 A2 | 6/1989 |
| JP | S62119035 A | 5/1987 |
| JP | H03169403 A | 7/1991 |
| JP | 2012180567 A | 9/2012 |
| JP | 2015081367 A | 4/2015 |

OTHER PUBLICATIONS (Translation of the Office Action) Ref. No., Mail No. 261782 dated Jul. 7, 2020, Notice of Reasons for Refusal, Application No. Japanese Patent Application No. 525766/2019, dated Jun. 29, 2020, 3346 4S00, Applicant's representative: Mr. Hajime Takashima (and 6 others) Applied Article(s) of the Patent Act: 29(1) and 29(2).
Korean Intellctual Property Office Notice of Preliminary Rejection, dated Sep. 4, 2020, Due Date: Nov. 4, 2020, Applicant: Baoshan Iron & Steel Co., Ltd., Attorney: Bae, Kim & LEE IP, Subject Korean Patent Application No. 10-2019-7013836, Title of the Invention: High-Strength Corrosion-Resistant Composite Chequered Iron and Manufacturing Method Therefor.
EPO, Date: Dec. 16, 2020, Applicant: Baoshan Iron & Steel Co., Ltd., Communication Pursuant to Article 94(3) EPC.
First Office Action, 200021, 201611037789.3, CN105671424A 20160615, CN104988414A dated Oct. 21, 2015.
Search, Application No. 2016110377893, Date of Filing: Nov. 23, 2016, Number of Claims: 10, Number of Paragraphs of Description: 79+6.
Second Search, Application No. 2016110377893, Date of Filing: Nov. 23, 2016, Number of Claims: 9.
Notification to Grant Patent Right for Invention, 200021, (021-53088936), 201611037789.3.
Second Office Action, 200021, (021-53088936), 201611037789.3, CN104080937A dated Oct. 1, 2014.

(56) References Cited

OTHER PUBLICATIONS

Rolled Clad Plates, Apr. 30, 2003, XP055676292, URL: http://files.engineering.com/download.aspx?folder=37977ece-eb0e-4192-851b-fe885f46f154&file=rolled_clad_plates.pdf.
International Search Report, International Application No. PCT/CN2017/111252, dated Feb. 26, 2018, Authorized Officer: Wu, Chenchen.
Extended European Search Report, European Patent Office, Munich, Germany, dated Mar. 24, 2020 Applicaiton No./Patent No. PCT/CN2017111252, Applicant/Proprietor: Baoshan Iron & Steel Co., Ltd., Communication, Application No. EP 17 87 3789.

* cited by examiner

HIGH-STRENGTH CORROSION-RESISTANT COMPOSITE CHEQUERED IRON AND MANUFACTURING METHOD THEREFOR

TECHNICAL FIELD

The invention relates to a cladding sheet and a manufacturing method thereof, in particular to a cladding chequered steel and a manufacturing method therefor.

BACKGROUND ART

The chequered sheet has the advantages of beautiful appearance and anti-slip surface, and thus is widely used in the market. At present, chequered steels can be divided into chequered carbon steel sheets and chequered stainless steel sheets. However, the above chequered steels have the following disadvantages:

For chequered carbon steel sheets, during the long-term use, there is a safety hazard in the use process due to corrosion of the carbon steel. Therefore, in order to prevent corrosion, it is necessary to regularly perform anticorrosion treatment on the chequered carbon steel. Anti-corrosion treatment requires enormous costs of production and labor, and prompts extremely strict requirements for processing environment (for example, the anti-corrosion process needs to be carried out in working areas with little dust). In addition, the anti-corrosion materials used in the process contain chemicals that are harmful to human health (for example, as anti-corrosion materials paints are used). Moreover, when the chequered carbon steel sheet is treated with anti-corrosion treatment, the anti-corrosion treatment also affects the use of the steel sheet. In addition, the chequered carbon steel sheet has disadvantages, such as low strength level, and a heavy weight of a component made therefrom due to the increase of the corrosion allowance.

For chequered stainless steel sheets, it has disadvantages such as low yield strength, which affects the overall stability of the component. In order to meet the stability requirements of the components, the thickness of the chequered stainless steel sheet is increased during use, thereby affecting the weight of the components.

In addition, both the chequered carbon steel sheet and the chequered stainless steel sheet are difficult to weld.

Based on the above considerations, it is desirable to clad roll a substrate layer and a cladding layer into a cladding chequered steel, while the carbon steel is used as a substrate layer providing structural properties such as strength, and the stainless steel sheet as a cladding layer providing corrosion resistance, and thereby the comprehensive requirements of strength and corrosion resistance can be met.

However, at present, the following technical difficulties are encountered in the prior art of rolling a cladding chequered steel:

(1) When rolling the chequer of a cladding chequered sheet, the metal of chequer layer flows into the groove of patterned roller, and the bonding surface of the cladding layer and the substrate layer suffer from a large tensile stress (especially when the cladding chequer layer is thin), the bonding surface is easily separated and cracked.

(2) The physical properties and high temperature deformation characteristics of the cladding layer and the substrate layer of a cladding chequered sheet are quite different, as a result, the chequered sheet after rolling is significantly increased due to the load distribution of the last pass stand, which makes the production unstable, resulting in uneven surface quality of the produced steel sheet.

(3) In a cladding chequered sheet, the chequer height is a main index for evaluating the surface chequer quality. However, in the prior art, it is difficult to meet the requirements for the height of the chequer.

SUMMARY OF THE INVENTION

One of the objects of the present invention is to provide a high-strength corrosion-resistant cladding chequered steel. Through a proper mass ratio of chemical components, the cladding chequered steel produced by clad rolling has a high strength, a high corrosion resistance, a yield strength of 470 MPa or more, a tensile strength of 610 MPa or more, a shear strength of 410 MPa or more, and an elongation of 40% or more.

In order to achieve the above object, the present invention provides a high-strength corrosion-resistant cladding chequered steel, comprising a substrate and a chequered cladding layer cladded on the substrate by single-sided or double-sided rolling; wherein the substrate comprising the following chemical elements in mass percentage:

C: 0.01% to 0.20%, Si: 0.10% to 0.5%, Mn: 0.5% to 2.0%, Al: 0.02% to 0.04%, Ti: 0.005% to 0.018%, Nb: 0.005% to 0.020%, 0<B≤0.0003%, N≤0.006%, and the balance being iron and other inevitable impurities.

In the high-strength corrosion-resistant cladding chequered steel according to the present invention, the inevitable impurities are mainly S and P elements. The lower the impurities content, the better the technical effect. However, in consideration of the actual steelmaking level of the steel mill, in the technical solutions of the present invention, P is controlled to 0.015% or less and S is 0.010% or less.

The design principle of each chemical element of the high-strength corrosion-resistant cladding chequered steel according to the present invention is as follows:

C: Carbon is an austenite stabilizing element, which has a solid solution strengthening effect on steel and significantly increases the strength of steel. However, having a mass percentage of more than 0.20% of carbon can detriment the weldability and toughness of the steel, and tend to increase hard phase structures such as pearlite structure and "martensite-austenite island", which adversely affect the corrosion resistance of the steel. Therefore, considering the balance between strength and toughness, and corrosion resistance of the steel sheet, the mass percentage of carbon in the substrate of the high-strength corrosion-resistant cladding chequered steel of the present invention is controlled to 0.01~0.20% to ensure the strength, toughness and good weldability of the high-strength corrosion-resistant cladding chequered steel.

Si: In the technical solutions of the present invention, the addition of silicon to the steel can improve the purity and deoxidation of the steel. Silicon has a solid solution strengthening effect in steel, but an over-high percentage of silicon is harmful to welding properties. Since the steel of the chequered cladding layer also contains silicon, in the technical solutions of the present invention, the mass percentage of silicon in the substrate is controlled to 0.10~0.50%. Silicon within such concent does impair the corrosion resistance of the chequered cladding layer and can enable good welding properties of the substrate.

Mn: In the technical solutions of the present invention, manganese delays the pearlite transformation, reduces the critical cooling rate, and improves the hardenability of the steel. In addition, manganese is the main solid solution strengthening element in steel, which has a solid solution strengthening effect on steel. However, when the mass percentage of manganese is higher than 2.0%, the segregation zone and the martensite structure are easily formed, which adversely affect the toughness of the steel. In addition, the segregation zone reduces the corrosion resistance of the steel. However, when the mass percentage of manganese is less than 0.5%, it is harmful to the increase of the strength level of steel. Therefore, in the substrate of the high-strength corrosion-resistant cladding chequered steel of the present invention, the mass percentage of manganese is controlled to 0.5~2.0%.

Al: Aluminum is a strong deoxidizing element in steel. In order to reduce the content of oxygen in the steel, the mass percentage of aluminum is controlled to 0.02~0.04%. In addition, the aluminum remaining after deoxidation can form AlN precipitates with the nitrogen element in the steel, which contributes to the strength of the steel and refines the austenite grain size of the steel during heat treatment.

Ti: Titanium is a strong carbide-forming element. The addition of a trace amount of titanium is advantageous for fixing the nitrogen in the steel, and the formed TiN suppresses the excessive growth of the austenite grains in the substrate layer when the cladding billet is heated, thereby refining the size of original austenite grain. Titanium also combines with carbon and sulfur in steel to form TiC, TiS, $Ti_4C_2S_2$, etc., which are present in the form of inclusions and second phase particles. The above carbonitride precipitates of titanium also prevent grain growth in the heat-affected zone during welding and improve welding performances. Therefore, in the substrate of the high-strength corrosion-resistant cladding chequered steel of the present invention, the mass percentage of titanium is controlled to 0.005~0.018%.

Nb: Niobium is a strong carbide forming element. In the technical solutions of the present invention, the addition of niobium to the substrate is mainly for increasing recrystallization temperature and refining grains in the substrate, which is advantageous for improving the low-temperature impact toughness of the substrate. Therefore, the mass percentage of niobium according to the present invention is controlled to 0.005~0.020%.

B: Boron greatly improves the hardenability of steel and inhibits the formation of bainite. In order to ensure the high strength of the high-strength corrosion-resistant cladding chequered steel according to the invention, the mass percentage of boron is controlled as: $0<B\leq 0.0003\%$.

N: In the technical solutions of the present invention, the effect of nitrogen is similar to that of carbon. The mass percentage of nitrogen is controlled to 0.006% or less to ensure the strength of the high-strength corrosion-resistant cladding chequered steel according to the present invention. In some preferred embodiments, in order to further improve the strength of the high-strength corrosion-resistant cladding chequered steel, the mass percentage of nitrogen is preferably controlled to N: 0.0005%~0.005%.

Further, in the high-strength corrosion-resistant cladding chequered steel according to the present invention, the substrate further comprises at least one of Ni, Cr and Mo, wherein Ni≤0.20%, Cr≤0.20%, and Mo≤0.10%.

Nickel is added because nickel can stabilize austenite and improve the strength of steel to some extent. The addition of nickel to steel (especially quenched and tempered steel) can significantly increase the low-temperature impact toughness of the steel. However, since nickel is a precious alloying element, excessive addition of nickel will increase production costs. Therefore, in the technical solutions of the present invention, an appropriate amount of nickel can be added to further improve the low-temperature impact toughness of the substrate, and the mass percentage of nickel is controlled to 0.20% or less.

Chromium is added because the segregation tendency of chromium is smaller than that of manganese. When there is obvious segregation zone and band structure in the steel of the substrate, the content of manganese can be appropriately reduced, and the reduced content can be replaced by chromium, thereby improving the strength and corrosion resistance of the steel. In addition, the addition of chromium to the substrate is also advantageous for suppressing diffusion of the chromium in the chequered cladding layer to the substrate. Therefore, in the present invention, chromium may be added in an appropriate amount, and the mass percentage of chromium is controlled to 0.20% or less.

Molybdenum is added because molybdenum can further refine grains and increase the strength and toughness of steel. In the technical solutions of the present invention, molybdenum reduces the temper brittleness of the steel, and precipitates fine carbides significantly strengthening the substrate of the steel during tempering. Further, the addition of molybdenum is advantageous for suppressing the self-temper brittleness which is easily occurred in the high-strength corrosion-resistant cladding chequered steel. However, since molybdenum is a very expensive alloying element, the mass percentage of molybdenum in the technical solutions of the present invention is controlled to 0.10% or less.

Further, in the high-strength corrosion-resistant cladding chequered steel according to the present invention, the chequered cladding layer is an austenitic stainless steel.

It should be noted that, in the high-strength corrosion-resistant cladding chequered steel according to the present invention, depending on specific situations of embodiments, austenitic stainless steels meeting the requirements of national or international standards, such as 304, 304L, 316 or 316L, can be selected and used as chequered cladding layer.

Further, in the high-strength corrosion-resistant cladding chequered steel according to the present invention, the substrate has a microstructure of ferrite+pearlite.

Further, in the high-strength corrosion-resistant cladding chequered steel according to the present invention, there is a transition layer at a joint of the substrate and the chequered cladding layer, and the thickness of the transition layer is 200 μm or less.

In the transition layer, the mass percentage of each chemical element is in a gradient distribution. That is, since the mass ratios of chemical elements in the chequered cladding layer and in the substrate are different, chemical elements diffuse from the side of high mass percentage to the other side of low mass percentage in the thickness direction to form a gradient distribution in the transition layer. The transition layer improves the bonding strength between the substrate and the chequered cladding layer, as a result, the two layers are not easy to delaminate and crack under the plastic deformation in the chequer forming process. In addition, the transition layer promotes that the metal element of the substrate flows following the flow of chequered layer metal, which is advantageous for the formation of a chequer height.

Further, in the high-strength corrosion-resistant cladding chequered steel according to the present invention, the thickness of the chequered cladding layer is 10~40% of the thickness of the high-strength corrosion-resistant cladding chequered steel. Controlling the thickness of the chequered cladding layer is advantageous for ensuring the formability of the chequer and the corrosion resistance of the chequered sheet, and is advantageous for improving the mechanical properties of the steel. When the thickness of the chequered cladding layer is more than 40% of the thickness of the high-strength corrosion-resistant cladding chequered steel, it has an adverse effect on the strength of the steel. When the thickness of the chequered cladding layer is less than 10% of the thickness of the high-strength corrosion-resistant cladding chequered steel, a sufficient chequer height cannot be obtained by rolling on the chequered cladding layer, which reduces the surface quality and service life of the steel. Therefore, controlling the chequered cladding layer to a certain thickness is advantageous for obtaining good corrosion resistance, mechanical properties and formability of the steel of the present invention.

Further, the high-strength corrosion-resistant cladding chequered steel according to the present invention has a yield strength of 470 MPa or more, a tensile strength of 610 MPa or more, a shear strength of 410 MPa or more, and an elongation of 40% or more.

Accordingly, another object of the present invention is to provide a method for manufacturing the above high-strength corrosion-resistant cladding chequered steel, comprising the steps of:

(1) producing a substrate blank and a cladding blank;

(2) assembling the substrate blank and the cladding blank, obtaining an billet, and welded sealing all around of bonding surface of each layer, and then vacuuming;

(3) clad rolling: the billet is first heated at a temperature of 1100~1180° C., and then multi-pass rolled to obtain a cladding steel sheet, wherein the total reduction is not less than 70% and the final rolling temperature is not less than 900° C., a surface chequer is rolled in the last pass of the multi-pass rolling, wherein the reduction in the last pass is 10%~20%;

(4) coiling after water-cooling.

In the manufacturing method of the present invention, a high-strength corrosion-resistant cladding chequered steel is obtained by clad rolling, a complete metallurgical bonding between the substrate and the cladding layer is realized by controlling the process parameters, and the obtained high-strength corrosion-resistant cladding chequered steel has both good corrosion resistance and excellent mechanical properties.

It should be noted that, in some preferred embodiments, in the step (2), the surface to be bonded of each layer is pretreated to remove the oxide film on the surface before the substrate blank and the cladding blank are assembled.

In addition, in the step (3), the heating temperature of the billet is controlled to 1100~1180° C. for the following reasons: when heated in the above temperature range, a uniform austenite structure is obtained in the cladding blank, the carbides are completely dissolved, and compounds of alloying elements such as niobium and titanium in the cladding blank are partially or completely dissolved, which is advantageous for complete metallurgical bonding.

Further, in the technical solutions of the present invention, a pattern roller is used to roll the surface chequer. The pattern of the surface chequer such as lentils shape or rhombus shape can be selected according to specific conditions of embodiments. In order to further improve the quality of the surface chequer, the engraving depth of the patterned roller is set to 2.8~4 mm.

Further, in the manufacturing method of the present invention, in the step (3), the final rolling temperature is controlled to 920-1000° C. for the following reasons: when the final rolling temperature is higher than 1000° C., the steel sheet is easily adhered to a patterned roller, and the groove of the patterned roller is filled, as a result, the surface quality of the steel sheet produced cannot meet the requirements.

Further, in the manufacturing method of the present invention, in the step (4), the coiling temperature is 500~650° C. for the following reasons: when the coiling temperature is higher than 650° C., the surface chequer of a steel sheet will be imprinted on the adjacent strip steel surface during coiling.

The high-strength corrosion-resistant cladding chequered steel of the present invention has high strength and high corrosion resistance by the design of substrate and chequered cladding layer, especially by controlling the mass ratio of the chemical elements in substrate. The high-strength corrosion-resistant cladding chequered steel has a yield strength of 470 MPa or more, a tensile strength of 610 MPa or more, a shear strength of 410 MPa or more, and an elongation of 40% or more.

In addition, the high-strength corrosion-resistant cladding chequered steel according to the present invention has a high surface quality without cracking or delamination.

In the manufacturing method of the present invention, a complete metallurgical bonding between the substrate and the cladding layer is realized by controlling the process parameters, and the obtained high-strength corrosion-resistant cladding chequered steel also has the above merits.

DETAILED DESCRIPTION

The high-strength corrosion-resistant cladding chequered steel and the manufacturing method thereof according to the present invention will be further explained and illustrated below with reference to the accompanying drawings and specific Examples. However, the explanations and illustrations do not unduly limit the technical solutions of the present invention.

Examples 1~4

Table 1 lists the mass percentage of the chemical elements in each layer of the high-strength corrosion-resistant cladding chequered steels of Examples 1~4.

TABLE 1

(wt %, the balance is Fe and other inevitable impurity elements other than P and S)

| Example | Layer | C | Si | Mn | P | S | Al | Ti | Nb | Ni | Cr | Mo | B | N |
|---|---|---|---|---|---|---|---|---|---|---|---|---|---|---|
| 1 | Cladding layer | | | | | | 304 stainless steel | | | | | | | |
| | Substrate | 0.1 | 0.35 | 1.5 | 0.01 | 0.005 | 0.04 | 0.018 | 0.02 | — | — | 0.1 | 0.00028 | 0.0045 |
| 2 | Cladding layer | | | | | | 304L stainless steel | | | | | | | |
| | Substrate | 0.14 | 0.25 | 1 | 0.01 | 0.005 | 0.03 | 0.014 | 0.011 | — | 0.2 | — | 0.0003 | 0.0052 |
| 3 | Cladding layer | | | | | | 316 stainless steel | | | | | | | |
| | Substrate | 0.2 | 0.15 | 0.5 | 0.008 | 0.004 | 0.02 | 0.005 | 0.005 | — | — | — | 0.0003 | 0.004 |
| 4 | Cladding layer | | | | | | 316L stainless steel | | | | | | | |
| | Substrate | 0.11 | 0.3 | 1.48 | 0.008 | 0.005 | 0.026 | 0.008 | 0.018 | 0.1 | — | — | 0.00028 | 0.0038 |

The high-strength corrosion-resistant cladding chequered steels of Examples 1~4 were prepared by the following steps (See Table 2 for specific process parameters for each Example):

(1) a substrate blank and a cladding blank was produced according the chemical composition listed in Table 1;

(2) the substrate blank and the cladding blank was assembled to obtain an billet, and all around of bonding surface of each layer were welded, sealed and then the space between the two layers was vacuumed;

(3) clad rolling: the assembly was first heated at a temperature of 1100~1180° C., and then multi-pass rolled to obtain a cladding steel sheet, wherein the total reduction rate was not less than 70% and the final rolling temperature was 920~1000° C., a surface chequer was rolled in the last pass of the multi-pass rolling, wherein the reduction rate in the last pass is 10%-20%;

(4) coiling after water-cooling, wherein the coiling temperature is 500~650° C.

Table 2 lists the specific process parameters in the manufacturing method of the high-strength corrosion-resistant cladding chequered steels of Examples 1~4.

TABLE 3

| Example | Yield strength (MPa) | Tensile strength (MPa) | Elongation (%) | cold bend radius (180°) | Shear strength (MPa) |
|---|---|---|---|---|---|
| 1 | 472 | 611 | 35.8 | 0.7 a | 420 |
| 2 | 507 | 649 | 36.0 | 0.7 a | 410 |
| 3 | 480 | 650 | 40.0 | 0.7 a | 415 |
| 4 | 482 | 638 | 38.0 | 0.7 a | 422 |

As can be seen from Table 3, Examples 1~4 exhibited a yield strength of 470 MPa or more, a tensile strength of 610 MPa or more, a shear strength of 410 MPa or more, and an elongation of 40% or more, indicating that the Examples of the present invention had high strength and excellent mechanical properties.

Figure 1:
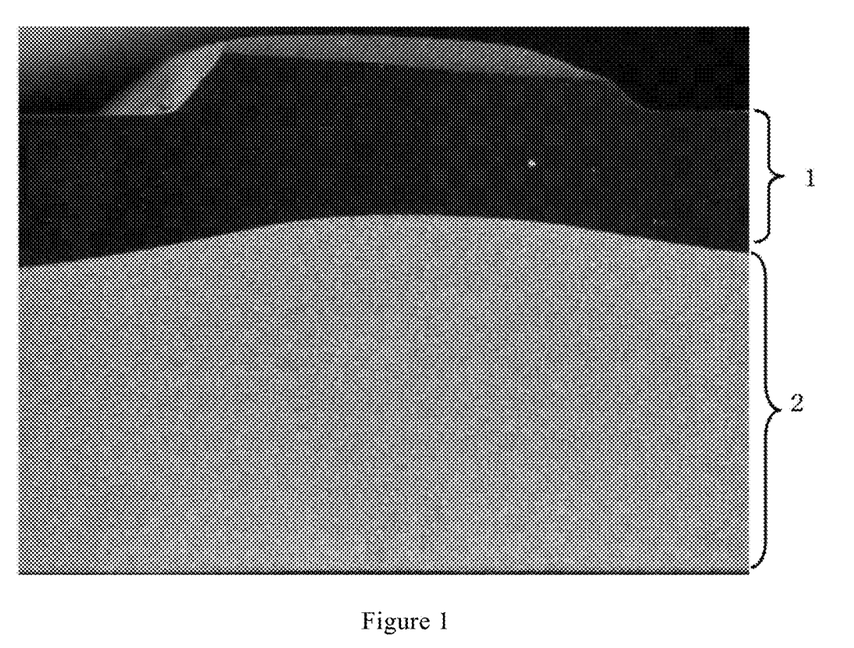
FIG. 1 shows the metallographic structure of the high-strength corrosion-resistant cladding chequered steel of Example 1 under a low power microscope.

FIG. 1 shows the metallographic structure of the high-strength corrosion-resistant cladding chequered steel of Example 1 under a low power microscope. As shown in FIG. 1, the high-strength corrosion-resistant cladding chequered steel of Example 1 had a chequered cladding layer 1 and a substrate 2.

Figure 2:
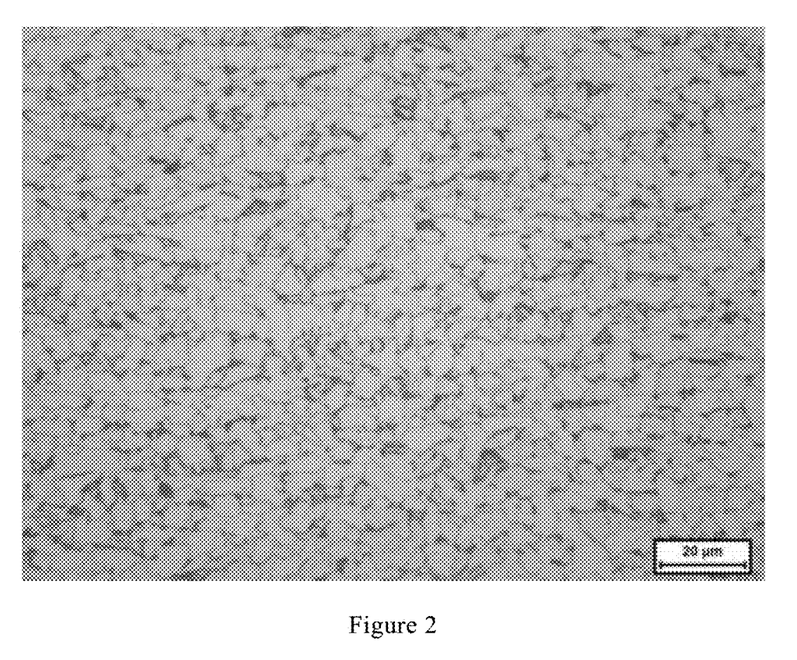
FIG. 2 is a photograph showing the metallographic structure of the substrate of the high-strength corrosion-resistant cladding chequered steel of Example 1.

FIG. 2 is a photograph showing the metallographic structure of the substrate of the high-strength corrosion-resistant cladding chequered steel of Example 1. As shown in FIG. 2,

TABLE 2

| Example | Blank structure of the billet | Heating temperature (° C.) | Steel sheet thickness (mm) | Chequered cladding layer thickness (mm) | Final rolling tempeature (° C.) | Total reduction (%) | Coiling temperature (° C.) | Reduction in last pass (%) | Substrate microstructure | Cladding layer microstructure |
|---|---|---|---|---|---|---|---|---|---|---|
| 1 | cladding layer + substrate + cladding layer | 1150 | 6 | 1.02 | 980 | 97 | 600 | 10 | ferrite + pearlite | Austenite |
| 2 | cladding layer + substrate + cladding layer | 1160 | 5 | 0.8 | 1000 | 98 | 655 | 12 | ferrite + pearlite | Austenite |
| 3 | cladding layer + substrate + cladding layer | 1140 | 4 | 0.5 | 990 | 98 | 550 | 10 | ferrite + pearlite | Austenite |
| 4 | cladding layer + substrate + cladding layer | 1180 | 5 | 1 | 980 | 97 | 580 | 15 | ferrite + pearlite | Austenite |

Table 3 lists the test results of the high-strength corrosion-resistant cladding chequered steels of Examples 1~4 in various performance tests.

the structure of the substrate was ferrite and pearlite, wherein grains in the microstructure was fine and uniform, and the average grain size of ferrite is 10 μm or less.

Figure 3:
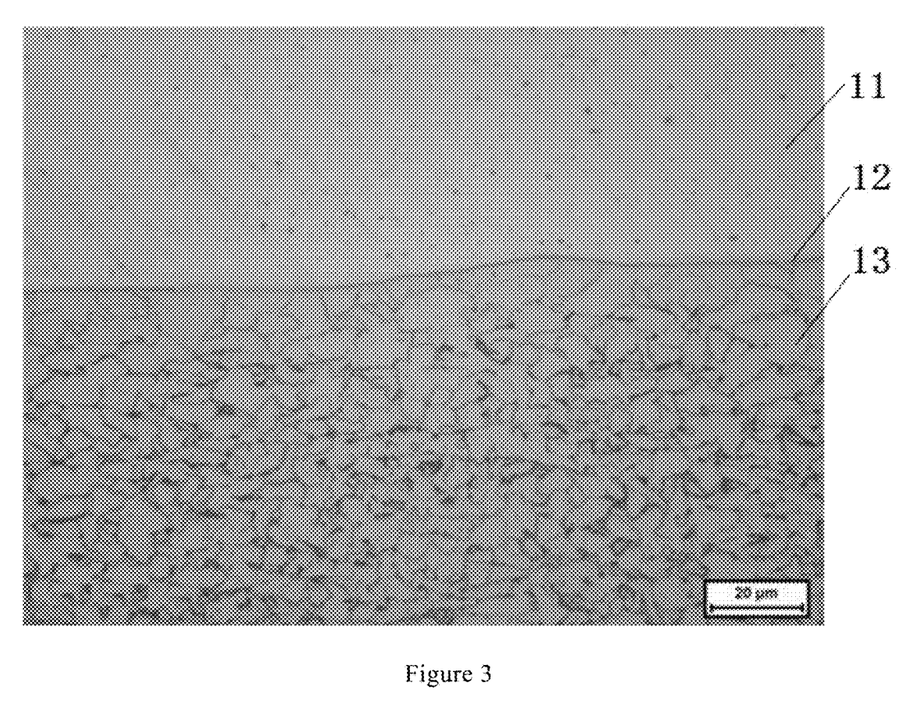
FIG. 3 is a photograph showing the metallographic structure of the transition layer on one side between the substrate and the chequered cladding layer of the high-strength corrosion-resistant cladding chequered steel of Example 1.

FIG. 3 is a photograph showing the metallographic structure of the transition layer on one side between the substrate and the chequered cladding layer of the high-strength corrosion-resistant cladding chequered steel of Example 1. As shown in FIG. 3, there was a transition layer 12 between the substrate 13 and the chequered cladding layer 11 of Example 1.

Figure 4:
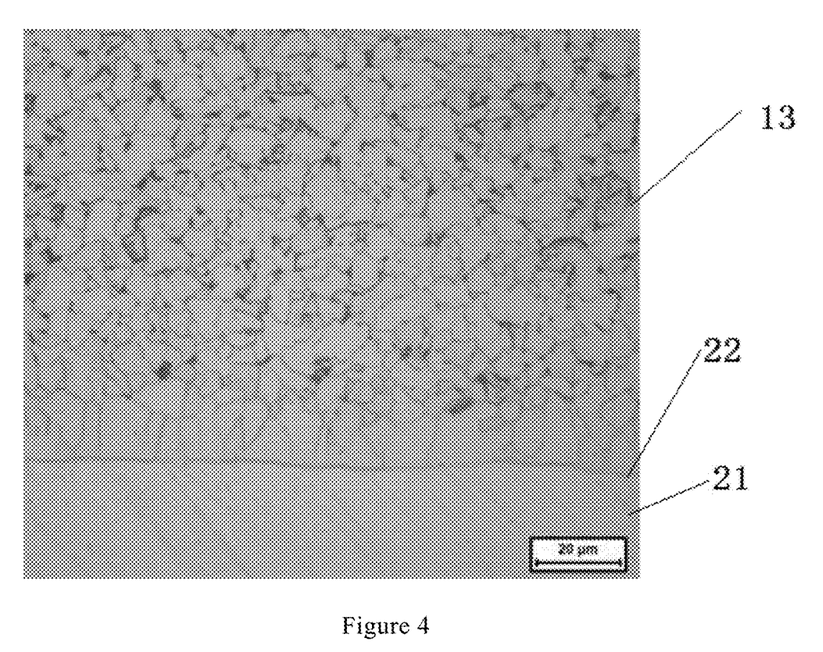
FIG. 4 is a photograph showing the metallographic structure of the transition layer on another side between the substrate and the chequered cladding layer of the high-strength corrosion-resistant cladding chequered steel of Example 1.

FIG. 4 is a photograph showing the metallographic structure of the transition layer on another side between the substrate and the chequered cladding layer of the high-strength corrosion-resistant cladding chequered steel of Example 1. As shown in FIG. 4, there was a transition layer 22 between the substrate 13 and the chequered cladding layer 21 of Example 1.

As can be seen from FIG. 3 and FIG. 4, in Example 1, there was a transition layer between the substrate and the chequered cladding layer cladded on the substrate by double-sided rolling. The transition layers 12, 22 improve the bonding strength between the substrate 13 and the chequered cladding layers 11, 21; as a result, Example 1 was not easy to delaminate and crack.

Figure 5:
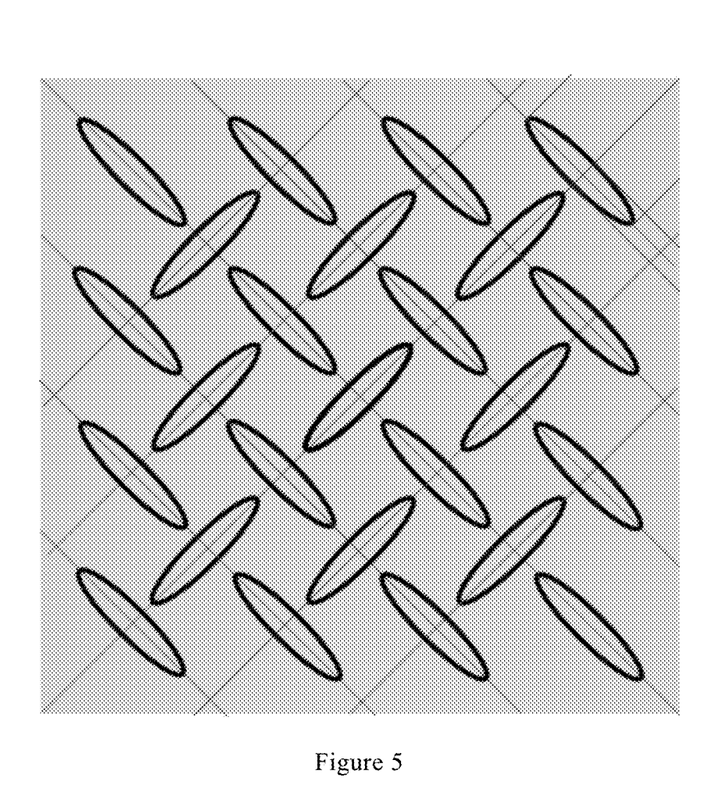
FIG. 5 is a schematic view showing the pattern of the surface chequer in the cladding layer of the high-strength corrosion-resistant cladding chequered steel of Example 1.

FIG. 5 is a schematic view showing the pattern of the surface chequer in the cladding layer of the high-strength corrosion-resistant cladding chequered steel of Example 1. As shown in FIG. 5, the surface pattern of Example 1 was a lenticular shape.

Figure 6:
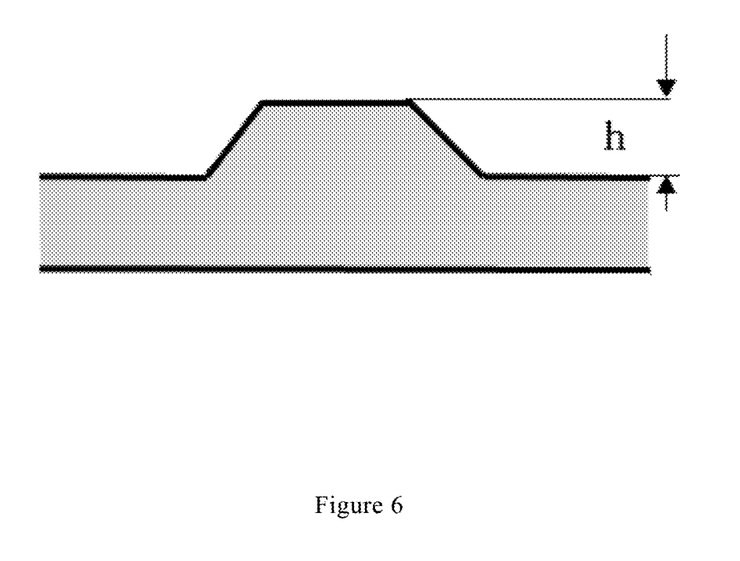
FIG. 6 is a schematic view showing the structure of the surface chequer in the cladding layer of the high-strength corrosion-resistant cladding chequered steel of Example 1 from another viewing angle.

FIG. 6 is a schematic view showing the structure of the surface chequer in the cladding layer of the high-strength corrosion-resistant cladding chequered steel of Example 1 from another viewing angle. As shown in FIG. 6, the height "h" of the surface chequer of Example 1 was 1.02 mm.

It should be noted that the above are merely illustrative of specific Examples of the invention. It is obvious that the present invention is not limited to the above Examples, but has many similar variations. All modifications that are directly derived or associated by those skilled in the art are intended to be within the scope of the present invention.

The invention claimed is:

1. A high-strength corrosion-resistant cladding chequered steel comprising a substrate and at least one chequered cladding layer cladded onto the substrate by rolling, wherein the at least one chequered cladding layer comprises a surface pattern applied thereto by a patterned roller, and the substrate comprises the following chemical elements in mass percentage:

C: 0.01% to 0.20%, Si: 0.10% to 0.5%, Mn: 0.5% to 2.0%, Al: 0.02% to 0.04%, Ti: 0.005% to 0.018%, Nb: 0.005% to 0.020%, 0<B<0.0003%, N<0.006%, and the balance being iron and other inevitable impurities;

wherein the substrate further comprises at least one of Ni, Cr and Mo in mass percentage: Ni<0.20%, Cr<0.20%, and Mo<0.10%; and wherein the thickness of the at least one chequered cladding layer is in a range of 10% to 40% of the thickness of the high-strength corrosion-resistant cladding chequered steel.

2. The high-strength corrosion-resistant cladding chequered steel according to claim 1, wherein the at least one chequered cladding layer is an austenitic stainless steel.

3. The high-strength corrosion-resistant cladding chequered steel according to claim 1, wherein the substrate has a microstructure of ferrite plus pearlite.

4. The high-strength corrosion-resistant cladding chequered steel according to claim 1, wherein there is a transition layer at a joint of the substrate and the at least one chequered cladding layer, and wherein the transition layer has a thickness of 200 μm or less.

5. The high-strength corrosion-resistant cladding chequered steel according to claim 1, wherein the steel has a yield strength of 470 MPa or more, a tensile strength of 610 MPa or more, and a shear strength of 410 MPa or more.

6. A method for manufacturing the high-strength corrosion-resistant cladding chequered steel according to claim 1, comprising the steps of:
(1) producing a substrate blank and a cladding layer blank;
(2) assembling the substrate blank and the cladding layer blank, obtaining a billet, and welded sealing all around the bonding surface of each layer, and then vacuuming;
(3) clad rolling: the billet is first heated at a temperature of 1100~1180° C., and then multi-pass rolled, obtaining a cladding steel sheet, wherein the total reduction is not less than 70% and the final rolling temperature is not less than 900° C., a surface chequer is rolled in a last pass of the multi-pass rolling, wherein the reduction in the last pass is 10%~20%;
(4) coiling after water-cooling.

7. The method according to claim 6, wherein, in the step (3), the final rolling temperature is controlled to 920~1000° C.

8. The method according to claim 6, wherein, in the step (4), the coiling temperature is 500~650° C.

* * * * *

UNITED STATES PATENT AND TRADEMARK OFFICE
CERTIFICATE OF CORRECTION

PATENT NO. : 11,130,161 B2
APPLICATION NO. : 16/461413
DATED : September 28, 2021
INVENTOR(S) : Bo Yan, Sihai Jiao and Xiaoming Xia It is certified that error appears in the above-identified patent and that said Letters Patent is hereby corrected as shown below:

On the Title Page

In the left column, item (86), the PCT No.:
"PCT/CN2017/011252"
Should be:
--PCT/CN2017/111252--.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*